UNITED STATES PATENT OFFICE.

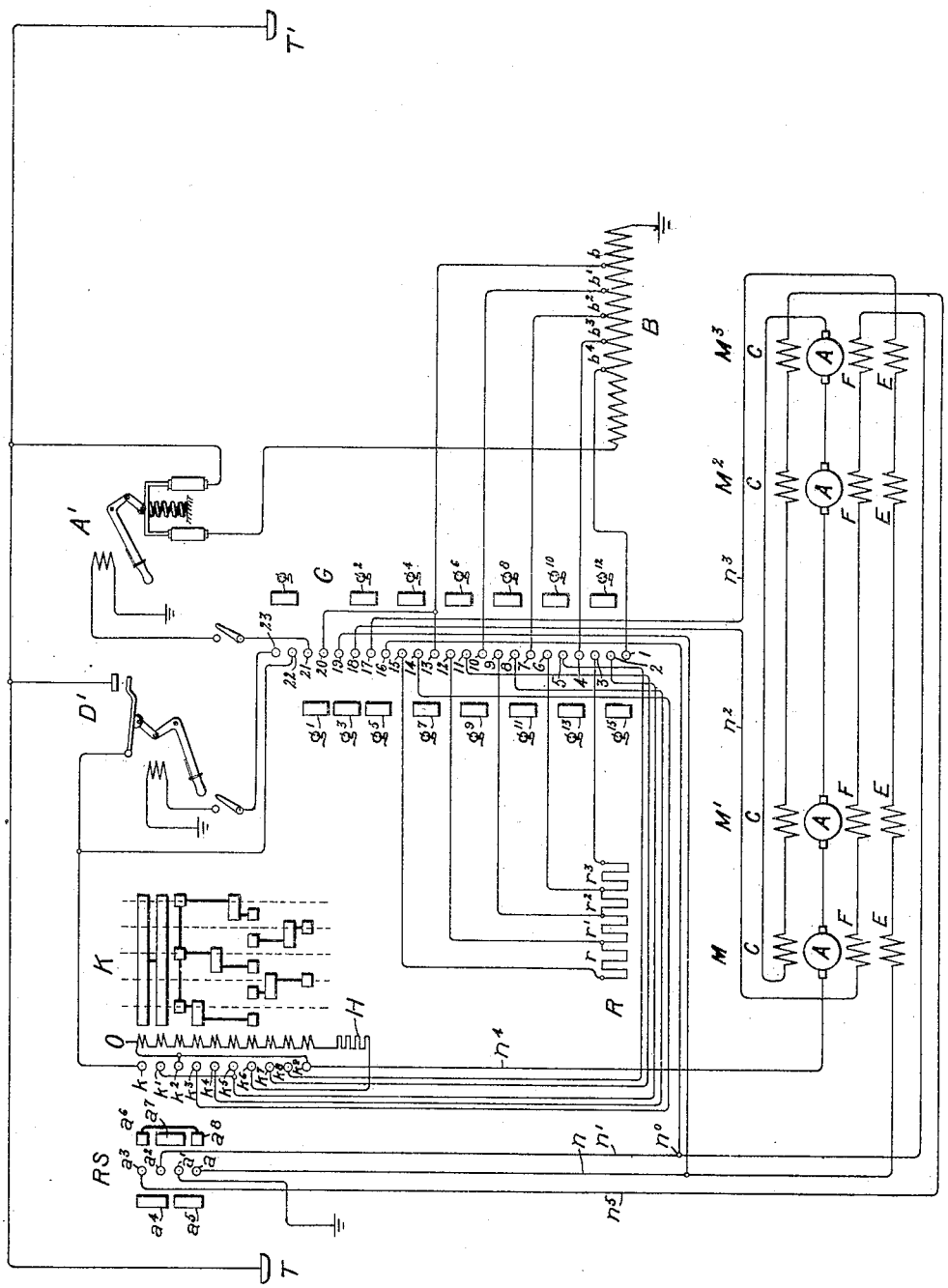

JESSE S. PEVEAR, OF SCHENECTADY, NEW YORK, ASSIGNOR TO GENERAL ELECTRIC COMPANY, A CORPORATION OF NEW YORK.

COMBINED ALTERNATING AND DIRECT CURRENT CONTROL APPARATUS.

No. 806,752.          Specification of Letters Patent.          Patented Dec. 5, 1905.

Application filed May 8, 1905. Serial No. 259,291.

*To all whom it may concern:*

Be it known that I, JESSE S. PEVEAR, a citizen of the United States, residing at Schenectady, county of Schenectady, State of New York, have invented certain new and useful Improvements in a Combined Alternating and Direct Current Control Apparatus, of which the following is a specification.

The present invention relates to control systems for electric circuits, and more particularly to systems of control for motors which are adapted for operation on both alternating and direct currents.

In electric-railway systems a practice has arisen of supplying portions thereof—as, for instance, sections in the country or over a private right of way—with a high-tension alternating current and other portions—as, for example, lines in city streets—with low-tension direct current. The motors and control apparatus for such railway systems must therefore be designed to operate on both kinds of current unless duplicate apparatus is employed. Certain types of motors will operate satisfactorily on either current; but the usual method of controlling the speed of direct-current motors—namely, by means of variable resistance—is not the one best adapted for use in connection with alternating-current motors. This method has, however, been heretofore employed for controlling the speed of the motors, both when running on alternating and on direct current, in order to obviate the necessity of providing separate controllers.

The object of the present invention is to provide a simple and efficient control system for motors operating alternately on alternate and direct currents so arranged that through the medium of a single master switch or controller the speed of the motor or motors may be governed by a governing device or apparatus best adapted for use with the particular current on which the motor is being operated.

To the above ends I have associated with each motor or group of motors a variable resistance which is adapted to be placed in the motor-circuit when operating on direct current and to be removed from said circuit step by step and also a transformer element across variable portions of which the motor or group of motors may be connected when operating on alternating current. In addition I have provided a controller the contacts of which are normally disconnected from both the resistance and the transformer element, but which may be connected to either through a suitable switch mechanism. By this means the motor or motors may at all times be operated and controlled in the most efficient manner irrespective of the character of the current which is being supplied, and by having the controller normally disconnected from the resistance and the transformer a single controller may be employed without danger of interference between the alternating-current and the direct-current devices.

The present invention will be more fully understood, and further objects will be apparent from the following description thereof.

In the accompanying drawing I have illustrated diagrammatically a preferred form of the present invention as embodied in a single car equipment.

Similar reference characters will be used to denote like parts throughout the specification and drawing.

M, M', M², and M³ represent four motors permanently connected in series, each motor having an armature A, a compensating field-coil C, and exciting field-coils E and F. The coils E and F are arranged to be connected in series when operating on direct current and in parallel when operating on alternating current. The type of motor and the grouping illustrated form no part of the present invention and may be varied at will.

T and T' indicate current-collecting devices, such as trolleys or collector-shoes.

R is a resistance made up of a number of sections $r$ to $r^3$, and B is an autotransformer having the taps $b$ to $b^4$.

D' and A' are respectively switches adapted to connect the car equipment to trolley when direct current is being supplied and when alternating current is being supplied.

G is a commutating-switch adapted to change the relative connections of the field-coils E and F and to connect the resistance and the autotransformer to controller K.

R S is a reversing-switch for determining the direction of rotation of the motors.

The commutating-switch G comprises a series of fixed contacts (indicated by the circles numbered 1 to 23) and two rows of movable contacts $g$ $g^2$ $g^4$ &c., to $g^{12}$ in one row and $g'$ $g^3$ $g^5$ &c., to $g^{15}$ in another row. Contact 13 is connected to tap $b$ of the autotransformer, contact 10 is connected to tap $b'$, contact 7 is connected to contact $b^2$, contact 4 is connected to tap $b^3$, and contact 1 is connected to tap $b^4$. Similarly, contacts 15, 12, 9, 6, and 3 are connected to the terminals of the resistance-sections $r$ to $r^3$. The fixed contacts 14, 11, 8, 5, and 2 are connected, respectively, to fixed contacts $k^3$ $k^7$ $k^4$ $k^8$ $k^5$ of the controller K. The movable contacts of the commutating-switch are so arranged that when the switch is moved to the left the resistance is connected to the controller-contacts, while upon moving the switch to the right the several taps on the autotransformer are brought into electrical connection with the same controller-contacts; but no controller-contacts can be connected at the same time to the resistance and to the autotransformer. The contacts 19 and 16 of the commutating-switch are connected to wires $n$ and $n'$, which connect with the fixed contacts $a$ $a^2$, respectively, of the reversing-switch, and contacts 18 and 17 are connected directly to the motors through wires $n^2$ and $n^3$. The contacts 20 to 23 and $g$ $g'$ are for the purpose of controlling the circuits for keeping the main switches D′ and A′ closed, the arrangement being that disclosed in my previous application, Serial No. 247,441, for switch-controlling mechanism.

The controller K is provided with five running positions, each of which corresponds to a resistance-point and to a tap on the autotransformer.

Assuming the commutating-switch to have been moved to the right and the switch D′ to be closed, thereupon upon moving the controller to its first running position current will flow from trolley T, through the switch D′, to contact $k$ of the controller and thence through the movable contacts of the controller to contact $k'$, to contact $k^5$, to the contact 2 of the commutating-switch, through contacts $g^{12}$ and 3, through the resistance R, through contacts 15, $g^4$, and 14, to the contact $k^3$, through the movable contacts of the controller-contact $k^6$, through the resistance H, blow-out coil O, through wire $n^4$, through the armatures of the motors, through field-coils C of the motors, through wire $n^5$, to contact $a^3$ of the reversing-switch, and if the reversing-switch has been thrown to the left then through contacts $a^4$ and $a^2$ to wire $n'$, field-coils F of the motors, contacts 18, $g^2$, and 17 of the commutating-switch, wire $n^3$, field-coils E of the motors, wire $n$, contacts $a$, $a^5$, and $a'$ of the reversing-switch, to ground. As the controller passes into the first running position circuit is broken at $k^6$ and is made at $k^2$, thereby cutting the resistance H and blow-out coil O out of circuit. The resistance H performs no function when the motors are operating on direct current, but, as will hereinafter appear, serves a very useful purpose when alternating current is being supplied. It is seen that the motors are now connected in series with each other and with the entire resistance, all the field-coils being in series. Upon moving the controller to its second position the current after entering the resistance is not required to pass through the section $r$; but after passing through the section $r'$ it flows through the contacts 12, $g^6$, and 11 of the commutating-switch and thence to the controller, through the motors, and to ground, as before. In the third position of the controller resistance-section $r'$ is cut out, and in the fourth and fifth positions section $r^2$ and section $r^3$ are cut out, so that in the final position the motors are connected across the line with no resistance in circuit.

In order to operate on an alternating current, the switch D′ is left open and switch A′ is closed, the commutating-switch being moved in this instance to the right. The resistance R is now idle and the transformer comes into play. In moving the controller to its first position current flows from the tap $b$ of the transformer, through contacts 13, $g^7$, and 14 of the commutating-switch, to contact $k^3$ of the master-controller and thence through the movable contacts of the controller to contact $k^6$, through resistance H, through the blow-out coil O, through wire $n^4$, through the armatures and field-coils C of the motors, contacts $a^3$ $a^4$ $a^2$ of the reversing-switch, wire $n'$, field-coils F of the motors, wire $n^2$, contacts 18, $g^3$, and 19 of the commutating-switch, through wire $n$, and thence through the reversing-switch to ground. A branch circuit passes from point $n^0$ on wire $n'$ through field-coils E in parallel with the coils F. As before, the resistance H and blow-out coil O are cut out of circuit when the controller reaches its first running position. The motors are now connected across a short portion of the autotransformer B, with their field-coils E and F connected in parallel with each other. In the second position of the master-controller one terminal of the motors is connected to tap $b'$ of the autotransformer, increasing the terminal voltage of the motors and causing them to speed up. Similarly, in the third, fourth, and fifth positions the connection of the motors is transferred to taps $b^2$, $b^3$, and $b^4$, thereby increasing successively the terminal voltage of the motors until the maximum voltage is reached at tap $b^4$.

It is during the shifting of the connection of the motor from one tap to another that the resistance H comes into operation. If the motor-circuit is not entirely interrupted—say at contact $k^2$ on the controller—before contact $k^7$ is brought into engagement with its coöperating contact, a short circuit of that portion of the transformer between taps $b$ and $b'$ will occur. It is not desirable to break the motor-circuit in passing from one running position of the controller to another, and therefore I have provided the resistance H, which, together with the blow-out coil O, bridges the contacts connected to consecutive transformer-taps in passing from one position to the next. The resistance of the element H and the blow-out coil is sufficient to prevent any injurious effect in the transformer. By utilizing the blow-out coil as a resistance the resistance H may be made smaller than would be the case if the resistance H alone were used to shunt the transformer-sections.

In reverse operation of the motors the reversing-switch R S is moved to the opposite position, in which contacts $a^6$ $a^8$ engage with the fixed contacts $a$ $a^3$. This causes current to flow through the field-coils E and F in the opposite direction from that previously traced, but does not affect the armatures and compensating field-coils.

The controller, it will be seen, is provided only with such contacts as are necessary for giving the proper running points when operating on direct currents, while in addition it is enabled to perform the independent function of controlling the motors through the transformer, the running positions of the controller representing like speed values when operating on either current. Therefore the present invention permits the use of the most efficient form of control not only when the motors are operating on direct current, but also when they are operating on alternating current without in any way complicating the construction and mode of operation of the motorman's switch.

Many changes may of course be made in the form and arrangement of the several constituent parts of the system illustrated without departing from the present invention. In the appended claims I aim to cover all modifications which come within the spirit of the present invention.

What I claim as new, and desire to secure by Letters Patent of the United States, is—

1. In combination, a motor adapted for operation on either alternating current or on direct current, a variable resistance, a variable transformer element, a controller, and a switch device arranged to alternately connect said resistance and said transformer element in operative relation to said controller and said motor, whereby said controller operates to vary the amount of resistance in the motor-circuit when operating on direct current and to vary the terminal voltage of the motor when operating on alternating current.

2. In combination, a motor adapted for operation on either alternating current or on direct current, a resistance, a transformer element, a controller having a plurality of sets of contacts, and a switch device arranged to connect the motor to one terminal of the resistance and the controller-contacts to a plurality of points on said resistance and to disconnect the resistance and connect the controller, transformer element and motor in operative relation with the controller-contacts connected to said transformer element at a plurality of points, whereby the controller serves to regulate the amount of resistance in the motor-circuit on direct current and the terminal voltage of the motor on alternating current.

3. In combination, a motor adapted to operate on either alternating or direct current, a device for governing the speed of the motor when operating on direct current, a device for governing the speed of the motor when operating on alternating current, a controller constructed and arranged to control each of said devices, and a switch arranged to connect the controller and motor in operative relation with either speed-governing device, whereby the same controller regulates the speed of the motor when operating on either alternating or direct current through the intervention of a governing device adapted to the particular current in use.

4. In combination, a motor adapted to operate on either alternating or direct current, a resistance device for governing the speed of the motor when operating on direct current, a variable potential device for governing the speed of the motor when operating on alternating current, a controller constructed and arranged to control each of said devices, and a switch arranged to connect the controller and motor in operative relation with either speed-governing device, whereby the same controller regulates the speed of the motor when operating on either alternating or direct current through the intervention of a governing device adapted to the particular current in use.

5. In combination, a motor adapted for operation on either alternating or direct current, a device for governing the speed of the motor when operating on alternating current, a device for governing the speed of the motor when operating on direct current, a controller having a plurality of running positions, and a switch device constructed and arranged to connect the motor and controller in operative relation with either of the speed-governing devices in such a manner that in each running position of the controller corresponding speeds are attained by the motor when running on alternating and on direct current.

6. In combination, a motor adapted for operation on either alternating or direct current, a variable potential-device for governing the speed of the motor when operating on alternating current, a resistance device for governing the speed of the motor when operating on direct current, a controller having a plurality of running positions, and a switch device constructed and arranged to connect the motor and controller in operative relation with either of the speed-governing devices in such a manner that in each running position of the controller corresponding speeds are attained by the motor when running on alternating and on direct current.

7. In combination, a motor adapted for operation on either alternating current or direct current, a resistance, a transformer element, a controller having a plurality of contacts, and a switch device constructed and arranged to connect the motor to one terminal of said resistance and each of said controller-contacts to a point on said resistance, said switch device being also arranged to disconnect the resistance and connect the controller, transformer element and motor in operative relation with said controller-contacts each connected to a point on the transformer element, whereby the controller is adapted to provide the same number of speed changes in the motor when operating on either alternating or direct current.

8. In combination, a motor adapted for operation on either alternating or direct current, a resistance, a transformer element, a controller having a plurality of sets of contacts arranged to engage in successive running positions of the controller, a switch device arranged to connect the controller in operative relation with the motor and resistance and to disconnect the resistance and connect the controller, transformer element and motor in operative relation to each other with one contact of each of said sets connected to a point on said transformer, an auxiliary resistance, and means for connecting said auxiliary resistance across successively-active sets of contacts in position of the controller intermediate the running position.

9. In combination, a motor adapted for operation on either alternating or direct current, a resistance, a transformer element, a controller having a plurality of sets of contacts arranged to engage in successive running positions of the controller, a switch device arranged to connect the controller in operative relation with the motor and resistance and to disconnect the resistance and connect the controller, transformer element and motor in operative relation to each other with one contact of each of said sets connected to a point on said transformer element, an electromagnetic blow-out for said contacts, an auxiliary resistance, and means for connecting the winding of said blow-out and said auxiliary resistance across successively-active sets of contacts in positions of the controller intermediate the running positions.

In witness whereof I have hereunto set my hand this 6th day of May, 1905.

JESSE S. PEVEAR.

Witnesses:
BENJAMIN B. HULL,
HELEN ORFORD.